United States Patent Office 2,962,910
Patented Dec. 6, 1960

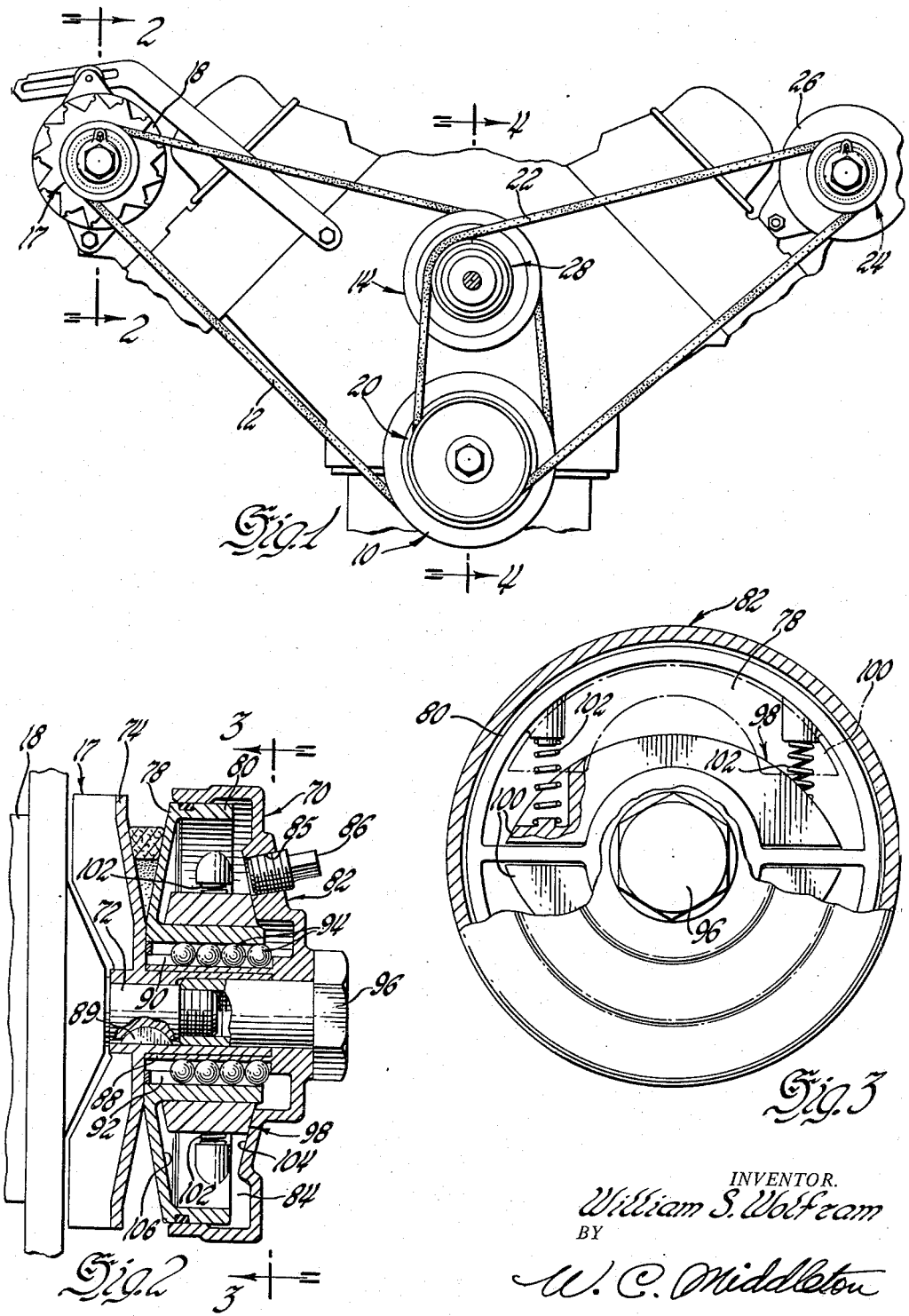

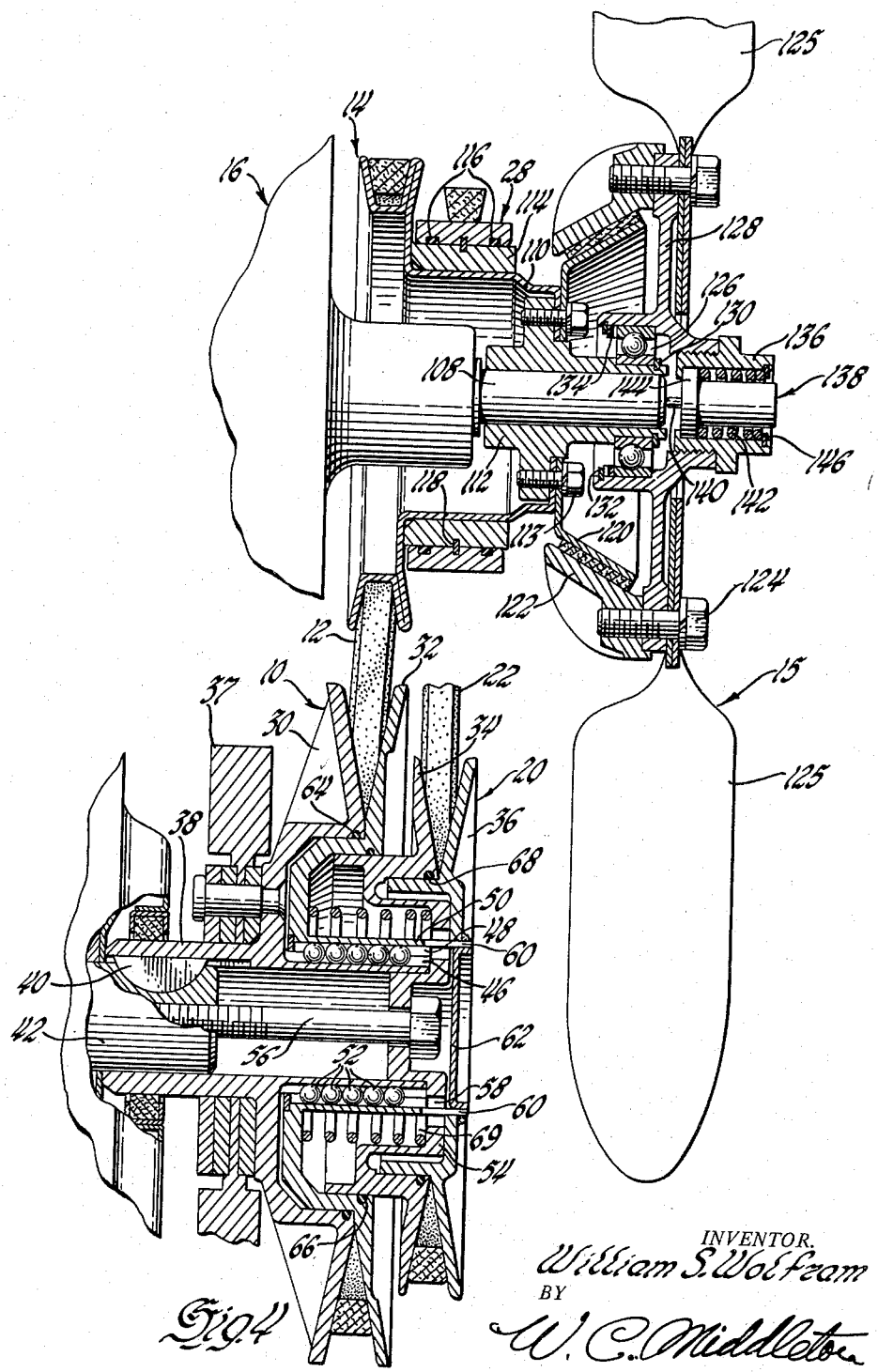

2,962,910

ACCESSORY DRIVE

William S. Wolfram, Birmingham, Mich., assignor to General Motors Corporation, Detroit, Mich., a corporation of Delaware Filed Sept. 3, 1957, Ser. No. 681,616

9 Claims. (Cl. 74—230.17)

This invention relates to improvements in variable speed drives and particularly to variable diameter pulley and belt drives adapted for numerous applications.

In small torque installations, e.g., those for driving, from the vehicle engine crankshaft, various accessories, such as generators, fans, air conditioners, etc., it is often necessary or at least, desirable to transfer the torque at varying speeds, but without using an expensive space consuming gear box. Therefore, variable diameter pulleys are sometimes used since simply by varying the operating diameters of the pulleys the speed ratios between driving and driven belt coupled pulleys can be altered. In any mode of changing the pulley diameters, many factors must be considered, among which are belt alignment, belt tension, bearing loads, heat, and frictional resistances. If some automatic device is employed to vary the pulley diameters then calibrations are a concern.

With these problems and others in mind the invention contemplates a variable diameter pulley and belt drive that is compact structurally, that by novel means contracts and expands pulleys against a minimum of frictional resistance, and that maintains adequate belt tension at all times.

By the invention a device utilizing fluid as an operating medium contracts and expands the pulleys in response to centrifugal force, hence reducing calibration problems. Fluid provides automatic operation without any external operating devices, such as pumps being required. An auxiliary device is afforded in the event the fluid device fails to operate.

Specifically, the pulleys for the drive comprise relatively movable pulley members with movements occurring through rollers to reduce wedging and cocking tendencies as well as frictional resistances. A biasing spring urges the pulley members towards one speed ratio position with belt tension being maintained without slip.

According to the invention, a pair of contractible and expandable driven pulleys are coupled by belts to similar drive pulleys. Each of the movable pulley members for the pulleys are slidable on roller or ball elements with a biasing spring arranged to contract the driving pulleys while expanding the driven pulleys. At some predetermined speed, a fluid device comprising a chamber containing fluid which is rotatable with the driven pulley will, in response to centrifugal force, force the driven pulley to contract which will cause the driving pulleys to expand in opposition to the biasing spring. An auxiliary device utilizing weights is arranged to operate should the fluid device fail, e.g., because of leakage, and thereby insures that the driven pulleys are not driven at an excessive speed which could injure the driven accessories.

The foregoing and other objects and advantages of the invention will be apparent from the following description and from the accompanying drawings in which:

Figure 1 is a front view of a vehicle accessory drive embodying the principles of the invention;

Figure 2 is a sectional view of a fluid device for varying the speed ratios of the drive taken along the line 2—2 of Figure 1;

Figure 3 is a fragmentary sectional view of an auxiliary device, which operates in the event of failure of the fluid device, taken along the line 3—3 of Figure 2, and Figure 4 is a sectional view of the drive taken along the line 4—4 of Figure 1.

Referring to Figure 1, the vehicle accessory drive illustrated comprises a driving pulley 10 coupled by a belt 12 to both a pulley 14 for a fan 15 and a water pump 16 (see Figure 4) and a pulley 17 for a generator 18. Another driving pulley 20, coaxial with driving pulley 10, drives, through a belt 22, a pulley 24 for an air conditioner compressor 26. A segment of the belt 22 wraps around an idler pulley 28 mounted coaxial with the fan pulley 14. The belts and the pulleys are of the well known V-type with each of the pulleys having outwardly diverging belt engaging surfaces forming some cone angle determined by the particular application. In this instance, a cone angle of 22° is preferred.

As best shown by Figure 4, the driving pulley 10 includes a fixed pulley member 30 and a movable pulley member 32 while the driving pulley 20 has a fixed pulley member 34 and a movable pulley member 36. The fixed pulley member 30 has attached thereto a conventional crankshaft vibration dampener 37 and includes a sleeve portion 38 which has one end keyed or otherwise secured at 40 to the engine crankshaft 42 and the opposite end provided with a series of spaced longitudinally extending external grooves 46. Juxtaposed to the grooves 46 is a series of similar internal grooves 48 formed in a sleeve portion 50 of the movable pulley member 32 which sleeve portion 50 is positioned concentric with the sleeve portion 38 for fixed pulley member 30. Interposed between the sleeve portions 50 and 38, within the spaces afforded by the grooves 46 and 48, are a plurality of balls 52 which permit relative axial movements but prevent relative rotational movements therebetween. A flange part 54 of the fixed pulley member 34 abuts the end of sleeve portion 38 of fixed pulley member 30 and through a bolt 56, threadedly engaged with the end of the crankshaft 42, axially positions the fixed pulley members 30 and 34 for pulleys 10 and 20. A group of diametrically spaced apertures 58 are provided in the flange part 54 through which extend drive fingers 60 on the end of the sleeve portion 50. The fingers 60 are welded or otherwise secured to the movable pulley member 36 for pulley 20 so that the two movable pulley members 32 and 36 move axially together. With this arrangement, drive is from the crankshaft 42 through sleeve portion 38 to both the fixed and movable pulley members 30 and 32 for pulley 10 with the latter movable pulley member 32 drive connected to the sleeve portion 38 by balls 52. Since the drive fingers 60 are secured to the movable pulley member 36 and extend through the apertures in the flange part 54 of the fixed pulley member 34, the pulley members 34 and 36 for pulley 20 are drive connected to each other and to the movable pulley member 32 for pulley 10. As a result all of the pulley members rotate as a unit at crankshaft speed.

The end opening in the vicinity of bolt 56 is sealed by a button 62 while seal rings 64, 66 and 68 are interposed between the respective pulley members to insure that dust and dirt is not allowed to interfere with the operation of the balls 52 and that any lubricant afforded cannot leak to the outside of the enclosure. If desired, balls may be used which do not require lubricant and the seals can be eliminated.

With the pulleys 10 and 20 arranged in the foregoing described manner, the overhang relative to the crankshaft end 42 is considerably reduced. Furthermore, the reduced overhang combined with the relatively frictionless operation of the balls 52 lessens opportunities for wedging or cocking between the fixed and movable pulley members during axial movement.

To bias the movable pulley members 32 and 36 to the Figure 4 contracted position and maintain adequate belt tension, a biasing spring 69 is disposed between the movable pulley member 32 for pulley 10 and a fixed pulley member 34 for pulley 20. Since the movable pulley members 32 and 36 are connected, both pulleys 10 and 20 will be urged towards the contracted position and will keep the engaging surfaces of the pulley members snugly against the sides of the belts preventing any tendency to slip which would generate heat as well as reduce the effectiveness of the drive.

In Figure 2 a fluid device, indicated generally at 70, for varying the pulley diameters, is depicted combined with the generator pulley 17 which together form a compact unit easily installable on an end of the generator shaft 72. Like the pulleys 10 and 20, generator pulley 17 has a fixed pulley member 74 and movable pulley member 78 with the latter pulley member including a cup-shaped portion 80. The cup-shaped portion 80 faces outwardly and is slidable within the confronting cup-shaped housing 82 to afford a fluid-tight chamber 84. Fluid may be supplied to the chamber 84 through an opening 85 in the housing 82 normally closed by filler plug 86. A hub 88 of the housing 82 is joined to a similar hub part of the fixed pulley member 74 and together they are keyed or otherwise fastened to the generator shaft 72 at 89. The hub 88 has a series of spaced longitudinally extending external grooves 90 juxtaposed to similar internal grooves 92 in the hub of the movable pulley member 78. A plurality of balls 94 are positioned in the spaces provided by the grooves 90 and 92 to permit relative axial movement between the fixed and movable pulley members 74 and 78 while restraining relative rotational movement therebetween. The fluid device 70 and pulley 17 are positioned axially on the generator shaft 72 by retaining nut 96 which threadedly engages the end of the generator shaft.

In describing the operation of the drive, it will be assumed that the movable pulleys 10 and 20 are contracted to the Figure 4 position and, accordingly, the generator pulley 17 and compressor pulley 24 are expanded, i.e., spread apart from the Figure 2 position, whereupon the pulleys 17 and 24 will be driven faster than the driving pulleys 10 and 20 or at an overdrive ratio. Upon attainment of some predetermined speed, e.g., 5000 r.p.m., the effect of centrifugal force acting on the fluid within the chamber 84 will create an expanding force which will cause the movable pulley member 78 for the pulley 17 to move towards the position illustrated in Figure 2 and force the belt 12 outwardly. In other words, the centrifugal effect on the fluid will cause it to tend to form an annular ring within the chamber 84. The pressure of the fluid within the ring, because of the resultant expanding force, will shift the movable pulley member 78 towards the Figure 2 position. As the belt 12 is forced outwardly, the biasing spring 69 will be overcome, and the movable pulley members 32 and 36, since they are joined together, will be expanded or moved away from their respective fixed pulley members 30 and 34. Since the belt 22 is moved inwardly with belt 12, the compressor pulley 24 will be contracted in the manner of generator pulley 17 either by a spring or due to the action of a fluid device similar to fluid device 70. When the crankshaft 42 slows down, the expanding force developed by the fluid device 70, due to reduced centrifugal force, will be overcome by the biasing spring 69 and the pulleys 10 and 20 will start to contract. Therefore, the belts 12 and 22 will expand the generator and compressor pulleys 17 and 24. Whether the pulleys are expanded or contracted, belt tension is maintained sufficiently to prevent slippage. Also, the fluid device 70, within a range determined by the opposing spring and fluid forces, will furnish an infinite number of drive ratios between the driving and driven pulleys.

The selection of the pulley diameters can be such that initially at low speeds of the crankshaft both the compressor pulley 24 and the generator pulley 17 are drive at a speed approximating the optimum operating speed of the accessory. Then as the crankshaft speed increases, the ratio can be reduced to maintain this optimum speed. By utilizing the fluid device 70, this can be achieved, since the belts 12 and 22 will be changed gradually to a lower speed ratio such as a direct drive ratio. Furthermore, with this arrangement a different drive ratio can be provided for each accessory, an advantage when one accessory operates more efficiently at one speed than another.

From the foregoing it can be seen that due to some mal-function the fluid device 70 could fail, e.g., due to a leak which would enable the fluid to escape from the chamber 84. Therefore, an auxiliary device, shown generally at 98 in Figures 2 and 3, is provided to insure against such an event. The auxiliary device 98 includes a pair of oppositely disposed centrifugal weights 100 surrounding the hub of the movable pulley member 78 and urged radially inwardly by a pair of springs 102 relative to the movable pulley member 78. The sides of the weights 100 are tapered to engage mating cam surfaces 104 and 106 formed, respectively, along the inside of the housing 82 and the inside of the cup-shaped portion 80 of the movable pulley member 78. If the fluid device 70 should fail to operate at some speed, such as 10,000 r.p.m., exceeding that at which the fluid device should have reduced the speed, the centrifugal weights 100 will be thrown radially outwardly due to centrifugal force and contract pulley 17. It can be seen that without this auxiliary device 98 the overdrive ratio could remain in effect as the crankshaft speed increases, and both the generator and compressor 18 and 26 could be driven at such an excessive speed that permanent damage could be caused. By utilizing fluid as a primary medium rather than centrifugal weights, the calibration problem is reduced since weights must necessarily be kept in balance. In this embodiment the weights are only for operating the auxiliary device 98 and need not be accurately balanced. Furthermore, the fluid is self-contained without any need for an external source such as a pump.

If desired, the fan 15 can be made to operate intermittently and conserve power when not needed. One such intermittent drive is shown in Figure 4 where the drive is made temperature-sensitive. The fan drive pulley 14 is secured to a water pump shaft 108 for water pump 16 through the connection of a hub part 110 thereof with a drive flange 112 by bolts 113. Positioned on the hub part 110 is a bearing 114 that supports the idler pulley 28 and accommodates the possible speed differential between pulleys 14 and 28. Idler pulley 28 has a pair of seal rings 116 spaced along the inner periphery thereof to maintain lubricant within the enclosed area and is positioned axially by a snap ring 118 located within blind grooves in both, the pulley 28 and the bearing 114. The snap ring 118 has been found adequate to take the negligible side thrusts from the belt. Secured to the drive flange 112 also by the bolts 113 is a cone clutch member 120 which is positioned adjacent to a mating cone clutch member 122. The cone clutch member 122 is affixed by bolts 124 to the fan blades 125 which, in turn, are rotatably supported by an anti-friction bearing 126 interposed between a support flange 128 and the drive flange 112. Axial movement of the bearing 126 is limited by a snap ring 130 on the drive flange 112 and a snap ring 132 on the support flange 128. A wave-type spring 134 is positioned between the snap ring 132 and the bearing 126 to assist in bearing alignment. Theadedly secured to the hub portion of the support flange 128 is a casing 136 in which is slidably installed a pellet motor 138 including a plunger 140. The pellet motor has a thermosensitive material therein which upon an increase in temperature will expand and cause the plunger 140 to move outwardly. In this instance, the plunger 140 will engage the end of the water pump shaft 108 which will cause the pellet motor 138 to move to the right against the opposing force from a coil spring 142 interposed between a guide shoulder 144 on the pellet motor 138 and a snap ring 146 secured to the casing 136. When this occurs, the spring 142 will cause the casing 136, support flange 128 and connected cone clutch member 122 to be moved also to the right. Cone clutch member 122 will engage cone clutch member 120 and then drive will be transferred from the pulley 14 through the cone clutch members 120 and 122 to the fan. When the cooling effect of the fan is sufficient to cool the thermosensitive material in the pellet motor 138, the plunger 140 will move back inside the motor 138 and the spring 142 and the wave spring 134 will cause the cone clutch members 120 and 122 to disengage. If desired, the cone clutch members 120 and 122 may be maintained in light slipping engagement at engine idle speeds sufficiently to rotate the fan 15 at some speed adequate for cooling purposes.

Although the belts 12 and 22 are slightly misaligned, at times, by the expansion and contraction of the pulleys, the misalignment with this embodiment was found to be negligible and did not interfere with the operation of the drive. Also, the variable speed drive demonstrated is adaptable for other applications and is capable of driving vehicle accessories other than those shown as will be apparent to those skilled in the art.

The invention is to be limited only by the following claims.

I claim:

1. A mechanism of the character described comprising, in combination, a pulley including pulley members axially movable relative to each other, fluid means for moving the pulley members relative to each other in response to centrifugal force within a speed range defined by predetermined upper and lower limits, and auxiliary means operative in response to centrifugal force acting thereon at a speed above the predetermined upper limit of said speed range so as to move the pulley members relative to each other.

2. A mechanism of the character described comprising, in combination, a pulley including a pair of conical members each having diverging faces for engaging a belt and mounted for relative axial movement, rollable bearing means interposed between the members both to drive connect and to allow relative movement therebetween, fluid means for moving the pulley members relative to each other in response to centrifugal force within a speed range defined by predetermined upper and lower limits, and auxiliary means operative in response to centrifugal force acting thereon at a speed above the predetermined upper limit of said speed range so as to move the pulley members relative to each other.

3. A mechanism of the character described comprising, in combination, a pulley including pulley members axially movable relative to each other, a housing formed by the pulley members to provide a chamber containing a fluid, the fluid in response to centrifugal force within a speed range defined by predetermined upper and lower limits causing relative movement between the pulley members, and a weight carried by the pulley members operative in response to centrifugal force acting thereon at a speed above the predetermined upper limit of said speed range to move the pulley members relative to each other.

4. A mechanism of the character described comprising, in combination, a pulley including pulley members axially movable relative to each other, each of the pulley members having cup-shaped portions positioned in confronting relation, one within the other, to afford an annular chamber containing a fluid, the fluid in response to centrifugal force within a speed range defined by predetermined upper and lower limits causing relative movement between the pulley members, each of the cup-shaped portions including cam surfaces, and a series of weights positioned within the chamber and engageable with the cam surfaces, the weights being movable outwardly along the cam surfaces in response to centrifugal force acting thereon at a speed above the predetermined upper limit of said speed range so as to move the pulley members relative to each other.

5. A mechanism of the character described comprising, in combination, a pulley including a pair of conical members each having diverging faces for engaging a belt, concentrically disposed sleeve portions, and cup-shaped portions, the sleeve portions each having a plurality of juxtaposed grooves, a series of balls positioned within the grooves both to maintain the concentric relation between the sleeve parts and to prevent relative rotation therebetween while permitting free relative axial movement of the conical members, the cup-shaped portions of the conical members being positioned in confronting relation, one within the other, to afford an annular chamber containing a fluid, the fluid in response to centrifugal force within a speed range defined by predetermined upper and lower limits causing relative movement between the conical members, each of the cup-shaped portions including cam surfaces, and a series of weights positioned within the chamber and engageable with the cam surfaces, the weights being movable outwardly along the cam surfaces in response to centrifugal force acting thereon at a speed above the predetermined upper limit of said speed range so as to move the conical members relative to each other.

6. In a variable speed drive, driving and driven shafts, a pulley mounted on each of the shafts, each pulley including fixed and movable pulley members drive connected to their respective shafts, a belt for coupling the pulleys together, a biasing spring for affording one drive ratio between the pulleys by contracting one of the pulleys and expanding the other of the pulleys while simultaneously maintaining the belt in tension without slip, rollable bearing means interposed between the pulley members of said one of the pulleys arranged both to drive connect and allow relative movement therebetween, the pulley members of said other of the pulleys both having belt engaging surfaces and portions thereof arranged in confronting relation so as to form a chamber containing a fluid, the fluid acting in response to centrifugal force within a speed range defined by predetermined upper and lower limits to oppose the biasing spring and thereby vary the drive ratio afforded by the biasing spring, and a weight carried by one of the pulley members of said other of the pulleys operative in response to a centrifugal force acting thereon at a speed above the predetermined upper limit of said speed range so as to move the pulley members relative to each other and vary the drive ratio.

7. In a variable speed drive, a driving shaft, a pair of driven shafts, a pair of driving pulleys drive connected to the driving shaft, each pulley including fixed pulley members and movable pulley members drive connected to each other, rollable bearing means interposed between the fixed and movable pulley members of the driving pulleys to prevent relative rotation while allowing free relative axial movement therebetween, a biasing spring for urging the fixed and movable pulley members together, a driven pulley drive connected to each of the driven shafts, belts for coupling the driving and driven pulleys together, each of the driven pulleys including fixed and movable pulley members, rollable bearing means interposed between the fixed and movable pulley members of the driven pulleys to prevent relative rotation while allowing free relative axial movement therebetween, the fixed and movable pulley members for one of the driven pulleys each having belt engaging surfaces and portions arranged in confronting relation so as to define a rotatable chamber containing a fluid, the fluid acting upon attainment of a predetermined centrifugal force to urge together the movable and fixed pulley members of the driven pulleys and to separate the movable and fixed pulley members of the driving pulley in opposition to the biasing spring to vary the drive ratio between the driving and driven pulleys, and a weight associated with one of the driven pulleys and operative in response to a centrifugal force greater than said predetermined centrifugal force to vary the drive ratio between the driving and driven pulleys in the event of failure of the fluid.

8. In a variable speed drive, expansible and contractible driving and driven pulleys, a belt for coupling the pulleys together, tension means for affording one drive ratio between the pulleys by contracting one of the pulleys and expanding the other of the pulleys while simultaneously maintaining the belt in tension without slip, fluid means operative in response to centrifugal force within a speed range defined by predetermined upper and lower limits to oppose the tension means and thereby vary the drive ratio afforded by the tension means, and auxiliary means operative in response to centrifugal force acting thereon at a speed above the predetermined upper limit of said speed range so as to vary the drive ratio afforded by the tension means.

9. In a variable speed drive, a driving shaft, a pair of driven shafts, a pair of driving pulleys drive connected to the driving shaft, each pulley including fixed pulley members and movable pulley members secured together for conjoint movement, rollable bearing means interposed between the fixed and movable pulley members of the driving pulleys to prevent relative rotation while allowing free relative axial movement therebetween, a biasing spring interposed between the fixed and movable pulley members for urging the fixed and movable pulley members together, a driven pulley drive connected to each of the driven shafts, and belts for coupling the driving and driven pulleys together, each of the driven pulleys including fixed and movable pulley members, the fixed and movable pulley members for one of the driven pulleys each having belt engaging surfaces and portions arranged in confronting relation so as to define a rotatable chamber containing a fluid, the fluid acting in response to centrifugal force to urge together the movable and fixed pulley members of the driven pulleys and to separate the movable and fixed pulley members of the driving pulleys in opposition to the biasing spring to vary the drive ratio between the driving and driven pulleys.

References Cited in the file of this patent

UNITED STATES PATENTS

| | | |
|---|---|---|
| 2,209,736 | Livingston | July 30, 1940 |
| 2,310,081 | Hill | Feb. 2, 1943 |
| 2,420,100 | Salsbury | May 6, 1947 |
| 2,479,764 | Morton | Aug. 23, 1949 |
| 2,623,400 | Davis | Dec. 30, 1952 |
| 2,640,365 | Michie | June 2, 1953 |
| 2,802,367 | Hoover | Aug. 13, 1957 |